US005337941A

United States Patent [19]

Higashiura et al.

[11] Patent Number: 5,337,941

[45] Date of Patent: Aug. 16, 1994

[54] MAGNET WIRE HAVING A HIGH HEAT RESISTANCE AND A METHOD OF REMOVING INSULATING FILM COVERING MAGNET WIRE

[75] Inventors: Atsushi Higashiura; Fumikazu Sano, both of Hiratsuka; Yoshitaka Tokimori, Anjo; Yoshitaka Natsume, Kariya, all of Japan

[73] Assignees: The Furukawa Electric Co., Ltd., Tokyo; Nippondenso Co., Ltd., Kariya, both of Japan

[21] Appl. No.: 40,652

[22] Filed: Mar. 31, 1993

[51] Int. Cl.$^5$ .............................................. B23K 1/00

[52] U.S. Cl. ................................ 228/205; 228/179.1; 219/68

[58] Field of Search ............... 228/179, 203, 205, 214, 228/227, 229, 230; 219/121.6, 121.61, 121.68, 121.69

[56] References Cited

U.S. PATENT DOCUMENTS 3,610,874 10/1971 Gagliano ........................ 219/121.64
4,815,673 3/1989 Wheeler ................................ 29/596

FOREIGN PATENT DOCUMENTS 46-22981 6/1971 Japan .
59-25509 2/1984 Japan .
1295609 11/1989 Japan .
217813 1/1990 Japan .
2155412 6/1990 Japan .
2197206 8/1990 Japan .
3212109 9/1991 Japan .
417989 1/1992 Japan .
4100652 4/1992 Japan .
4105509 4/1992 Japan .

OTHER PUBLICATIONS

Electri-onics, Feb. 1985, Laser Wire Stripper Effectively Removes "ML" Polymide for Repeated Solderability.

*Primary Examiner*—Samuel M. Heinrich
*Attorney, Agent, or Firm*—Cushman, Darby & Cushman

[57] ABSTRACT

The present invention provides a magnet wire having a high heat resistance, a conductor, and an inner layer formed by baking a first resin coating covering the outer surface of the conductor. The inner layer has a heat resistance which is not lower than 130° C. and is lower than 200° C. An outer layer is formed by baking a second resin coating covering the outer surface of the inner layer, the outer layer having a heat resistance which is not lower than 200° C., the thickness of the lower layer falling within a range of between 0.3 $\mu$m and 5 $\mu$m and being not larger than $\frac{1}{3}$ of the sum of the thicknesses of the outer and inner layers. The present invention also provides a method of removing an insulating covering from a magnet wire having a high heat resistance comprising the steps of: preparing a magnet wire having a high heat resistance, and irradiating an insulating covering of said magnet wire with a converged laser beam having a high energy.

5 Claims, 1 Drawing Sheet

MAGNET WIRE HAVING A HIGH HEAT RESISTANCE AND A METHOD OF REMOVING INSULATING FILM COVERING MAGNET WIRE

BACKGROUND OF THE INVENTION

1. Field of the Invention

The present invention relates to a magnet wire having a high heat resistance, i.e., resistance to at least 200° C., and to a method of removing an insulating covering from the magnet wire having a high heat resistance.

2. Description of the Related Art

In recent years, electronic appliances tend to become smaller and smaller in size and lighter and lighter in weight, with the result that a high heat resistance is required in a magnet wire used for forming, for example, a coil. Resin materials adapted for use in the manufacture of a magnet wire having a high heat resistance include, for example, polyimide, polyamideimide, polyparabanic acid, polyhydantoin, polyesteramideimide, and polyesterimide.

Where the insulating covering of the magnet wire of this type is removed for the terminal processing of the magnet wire, it was customary to employ a mechanical method using, for example, a wire stripper or a sand paper. It is also known to the art to burn away the insulating covering. In the conventional technique, however, a serious damage is done to that region of the conductor of the magnet wire from which the insulating covering is removed, resulting in failure to ensure a sufficient reliability when the wires are connected to each other or the wire is connected to the terminals of parts.

A measure for overcoming the difficulty inherent in the prior art is proposed in, for example, Published Unexamined Japanese Patent Application No. 49-97288. The magnet wire proposed in this prior art comprises an insulating covering of a laminate structure consisting of an outer layer formed of polyimide or polyamideimide and a inner layer formed of a polyesterimide which does not contain an aromatic trihydric alcohol having relatively low heat resistance. It is taught that a soldering treatment can be applied directly to the magnet wire proposed in this prior art without removing the insulating covering. Because of the high solderability, the terminal processing can be markedly facilitated. However, in the insulating covering included in the magnet wire proposed in this prior art, the outer layer having a relatively high heat resistance is formed thin, with the inner layer having a relatively low heat resistance being formed thick. Because of the particular construction, the magnet wire is not satisfactory in heat resistance. To be more specific, the magnet wire proposed in JP '288 noted above fails to exhibit a heat resistance of 200° C. or more specified in IEC (International Electrotechnical Commission) Pub. 172. Also, when an excess current flows through the magnet wire, the resin material in the inner layer of the insulating covering is decomposed and foamed, with the result that the outer layer tends to be broken so as to bring about a short-circuit problem.

On the other hand, it is impossible to apply a soldering treatment directly to a magnet wire without removing the insulating covering, when it comes to a magnet wire comprising an insulating covering which exhibits a heat resistance of 200° C. or more specified in IEC Pub. 172. Naturally, the terminal processing of the magnet wire is made troublesome.

As described above, it is impossible to obtain presently a magnet wire which can be subjected to a terminal processing without difficulty and which comprises an insulating covering capable of exhibiting a heat resistance of at least 200° C. specified in IEC Pub. 172. Such being the situation, a laser-removing method, in which the insulating covering is irradiated with a laser beam for removing the insulating covering, attracts attentions as a method which readily permits a terminal processing of a magnet wire without doing damage to the conductor of the magnet wire. The laser-removing method is described in various publications including, for example, Published Unexamined Japanese Patent Application No. 59-25509, Published Unexamined Japanese Patent Application No. 1-295609, Published Unexamined Japanese Patent Application No. 2-17813, Published Unexamined Japanese Patent Application No. 2-155412, Published Unexamined Japanese Patent Application No. 2-197206, Published Unexamined Japanese Patent Application No. 3-212109, Published Unexamined Japanese Patent Application No. 4-17989, Published Unexamined Japanese Patent Application No. 4-105509, and Published Unexamined Japanese Patent Application No. 4-100652.

The present inventors have paid attentions as an effective method to the terminal covering removing method using an excimer laser. It has been found that, where the excimer laser method is applied to a magnet wire of the conventional construction, it is certainly possible to remove the insulating covering in the first irradiation. However, it has also been found that the insulating covering is decomposed to generate carbon, when the insulating covering is exposed to the excimer laser beam, with the result that the generated carbon is attached to the periphery of the laser-irradiated region so as to inhibit the removal of the insulating covering in the second laser beam irradiation et seq.

It has been found through further researches that a $CO_2$ laser, particularly a pulse oscillation type $CO_2$ laser, is most adapted for the removal of the insulating covering. However, the treatment with the pulse oscillation type $CO_2$ laser has been found to take at least as much as 15 seconds for removing the insulating covering from a magnet wire exhibiting a heat resistance of at least 200° C. specified in IEC Pub. 172, e.g., a magnet wire comprising a polyimide insulating covering. It follows that the treatment with a $CO_2$ laser beam is unsuitable for the practical application in the industry.

Incidentally, it is described in Published Unexamined Japanese Patent Application No. 3-212109 that an insulating covering of a magnet wire having a high heat resistance is removed by the treatment with a pulse oscillation type $CO_2$ laser beam so as to permit a soldering treatment. In this method, however, it is necessary to apply pre-treatments such as heating or immersing in water to the magnet wire. It is also necessary to increase very much the irradiation density of the laser beam. In the Example described in this prior art, the laser beam irradiation density is as high as 72 $J/cm^2$ or more. Further the magnet wire is disposed at a position closer to a converging lens than the focus of the laser beam. What should also be noted is that the method disclosed in this prior art is dangerous. Specifically, since the irradiation density of the laser beam is very high in this method, spark is likely to take place in the focus of the laser beam. Further, the insulating covering is removed in only a very small region. Also, since a pre-treatment is required, the operability is very low.

SUMMARY OF THE INVENTION

An object of the present invention is to provide a magnet wire having a high heat resistance, which produces effects summarized below:

1. A high heat resistance specified in IEC Pub. 172.
2. An insulating covering can be removed easily and in a short time by using a pulse oscillation type $CO_2$ laser.
3. An insulating covering over a wide region can be removed with safety and without involving a pretreatment.
4. A soldering treatment with a high reliability can be applied to the terminal of a magnet wire after removal of the insulating covering.
5. An insulating covering can be removed without doing damage to the conductor of the magnet wire.

According to one aspect of the present invention, there is provided a magnet wire having a high heat resistance, comprising a conductor and a inner layer formed by baking a first resin coating covering the outer surface of the conductor, said inner layer having a heat resistance specified in IEC Pub. 172, which is not lower than 130° C. and is lower than 200° C., and an outer layer formed by baking a second resin coating covering the outer surface of said inner layer, said outer layer having a heat resistance specified in IEC Pub. 172, which is not lower than 200° C., the thickness of said inner layer falling within a range of between 0.3 μm and 5 μm and being not larger than ⅓ of the sum of the thicknesses of the outer and inner layers.

Another object of the present invention is to provide a method of removing an insulating covering from a magnet wire having a high heat resistance, which permits removing easily and in a short time the insulating covering from the magnet wire.

According to another aspect of the present invention, there is provided a method of removing an insulating covering from a magnet wire having a high heat resistance, comprising the steps of preparing a magnet wire having a high heat resistance; and irradiating said insulating covering with a converged laser beam having a high energy.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWING

The accompanying drawing, which is incorporated in and constitutes a part of the specification, illustrates presently preferred embodiments of the invention and, together with the general description given above and the detailed description of the preferred embodiments given below, serves to explain the principles of the invention.

DETAILED DESCRIPTION OF THE PREFERRED EMBODIMENT

Figure 1:
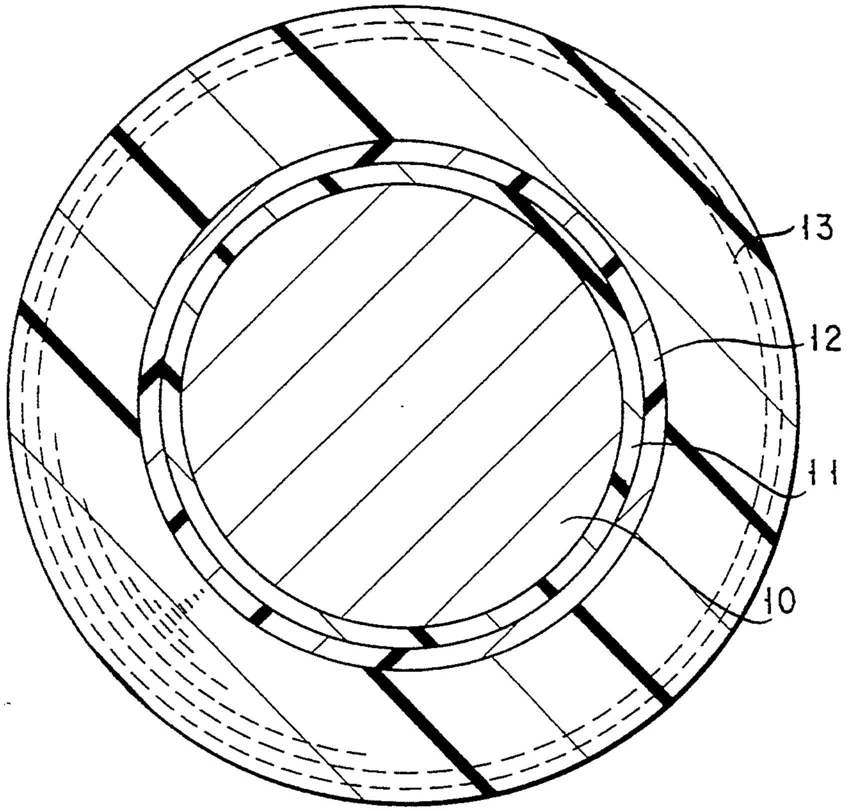
FIG. 1 is a cross sectional view showing a magnet wire having a high heat resistance according to one embodiment of the present invention.

The present inventors have found that the time required for removing an insulating covering is greatly dependent on a very thin layer in direct contact with a conductor, arriving at the present invention. In the magnet wire of the present invention, the insulating covering is of two-layer structure consisting of a inner layer formed by baking a first resin coating covering the outer surface of the conductor, said inner layer having a heat resistance specified in IEC Pub. 172 (The specified heat resistance of each element of the present invention was based on the test procedure defined in International Electrochemical Commission Publication 172. In particular, this publication describes a universal test procedure and, thus, standard for the determination of the temperature index of enamelled winding wires.), which is not lower than 130° C. and is lower than 200° C., and an outer layer formed by baking a second resin coating covering the outer surface of said inner layer, said outer layer having a heat resistance specified in IEC Pub. 172, which is not lower than 200° C. Further, the thickness of the inner layer is defined to fall within a predetermined range in the present invention. The magnet wire of the particular construction defined in the present invention makes it possible to obtain effects 1 to 5 described previously.

In the magnet wire of the present invention, a conductor is covered with an insulating covering of a two-layer structure consisting of inner and outer layers, as described above. The first resin coating forming the inner layer consists of a resin having a heat resistance specified in IEC Pub. 172, which is not lower than 130° C. and is lower than 200° C. If the resin which forms the inner layer has a heat resistance specified in IEC Pub. 172, which is lower than 130° C., the produced magnet wire fails to exhibit a sufficiently high heat resistance, making it impossible to use the magnet wire in an equipment which is heated to 180° C. or more during the operation. On the other hand, if the resin which forms the inner layer has a heat resistance of at least 200° C. specified in IEC Pub. 172, it is difficult to remove the insulating covering by irradiation with a pulse oscillation type $CO_2$ laser.

The resins used for forming the first resin coating include, for example, a polyester series resin, a polyesterimide series resin without containing aromatic trihydric alcohol, and a polyesterimide modified polyurethane. The polyester series resin includes, for example, a thermosetting polyester obtained by the reaction between an aliphatic trihydric alcohol or an aliphatic dihydric alcohol and phthalic acids. The polyesterimide series resin includes, for example, a thermosetting polyesterimide obtained by the reaction among an aromatic trihydric alcohol or an aliphatic dihydric alcohol, phthalic acids, trimellitic acid anhydride and a diamine. The aromatic trihydric alcohol noted above includes, for example, tris hydroxyethyl isocyanurate and tris hydroxymethyl isocyanurate.

It is necessary for the resin used for forming the second resin coating constituting the outer layer to exhibit a heat resistance of 200° C. or more specified in IEC Pub. 172. The resins used for forming the second resin coating include, for example, a polyimide series resin, a polyamideimide series resin, a polyparabanic acid series resin, a polyhydantoin series resin, a polyesteramideimide series resin and a polyesterimide series resin containing aromatic trihydric alcohol. The polyimide series resin noted above is synthesized from a carboxylic acid dianhydride, and diamine or diisocyanate. The polyamideimide series resin noted above is synthesized by the reaction between trimellitic acid anhydride and diphenylmethane diisocyanate. The polyparabanic acid series resin can be synthesized by the reaction between diisocyanate and prussic acid, followed by hydrolyzing the reaction product. The polyhydantoin series resin can be synthesized by the reaction between a diglycine derivative and a diamine. Further, the polyesteramideimide series resin used in the present invention can be synthesized by the reaction among trimellitic acid anhydride, phthalic acids, diamine and a polyhydric alcohol.

In the present invention, the thickness of the lower layer of the insulating covering is set at 0.3 μm more. If the inner layer is thinner than 0.3 μm, the heat resistant resin forming the outer layer tends to remain unremoved partially after irradiation with a laser beam. In view of the product yield, it is desirable for the inner layer to be at least 1 μm thick. In the present invention, it is also important to determine the thickness of the insulating covering such that the thickness of the inner layer does not exceed ⅓ of the total thickness of the insulating covering, i.e., the sum of the outer and inner layers. If the thickness of the inner layer exceeds ⅓ the total thickness of the insulating covering, the resultant magnet wire fails to exhibit a sufficiently high heat resistance. It is also important to set the upper limit of the thickness of the inner layer at 5 μm. Where the outer diameter of the magnet wire is increased, it is unavoidable for the insulating covering to be also increased in thickness. Even in this case, it is necessary for the inner layer of the insulating covering not to exceed 5 μm. If the thickness of the inner layer exceeds 5 μm, the magnet wire fails to exhibit a sufficiently high heat resistance.

It is possible for the inner layer to be of a single layer structure or a laminate structure as shown in FIG. 1. Specifically, FIG. 1 shows a magnet wire comprising a conductor 10 and an insulating covering consisting of a first coating layer 11, a second coating layer 12, and an outer layer 13. In this embodiment, the first coating layer 11 and the second coating layer 12 may be formed of the same resin material or different resin materials. Where the inner layer is of a single layer structure or a laminate structure consisting of only two layers, the magnet wire is adapted for a mass production. On the other hand, the outer layer 13 is markedly thicker than the inner layer as shown in the drawing. Generally, the number of coating treatments required for forming the outer layer 13 may be more than twice the number of coating treatments required for forming the inner layer.

In the present invention, the insulating covering is removed for a terminal processing with a laser beam having a high energy. The laser which can be used in the present invention includes, for example, a pulse oscillation type $CO_2$ laser of TEA type or another type, an excimer laser and a continuous oscillation type $CO_2$ laser. In the case of removing the insulating covering with a laser beam, a pre-treatment need not be applied to the magnet wire. It is desirable to set the irradiation density of the laser beam at 55 J/cm$^2$ or less. If the irradiation density of the laser beam exceeds 55 J/cm$^2$, a spark is generated at the focus of the converged laser beam so as to put an operator in a dangerous position.

Where an insulating covering is irradiated with a laser beam in the method of the present invention for removing the insulating covering, it is desirable to dispose the insulating covering not to be positioned in the focus of the laser beam. In other words, it is desirable for the insulating covering to be positioned closer to or more apart from the laser than the focus of the laser beam in order to enable the insulating covering to be removed over a broader region. To be more specific, the irradiation range of the laser beam is broadened with increase in the distance between the insulating covering to be removed and the focus of the laser beam, and is diminished as the insulating covering to be removed is positioned closer to the focus of the laser beam. It follows that it is possible to control as desired the irradiation range of the laser beam by changing the position of the insulating covering. In the case of, for example, a pulse oscillation type $CO_2$ laser using a lens converging laser beam in a rectangular or an elliptic shape of corresponding major axis with vertical direction, it is possible to irradiate the insulating covering over an area of about 5 to 15 mm in the longitudinal direction and about 1 to 5 mm in the width direction with the laser beam. The irradiation area is dependent on the lens. In the case of, for example, a pulse oscillation type $CO_2$ laser, the insulating covering can be removed sufficiently with the laser beam irradiation for about one second or two seconds, which is very short compared with the prior art.

In the method of the present invention, both the outer layer and the inner layer of the insulating covering can be removed by the laser beam irradiation. After the laser beam irradiation, the very thin inner layer denatured by the heat of the laser beam is left attached to the outer surface of the conductor. However, since the residual layer is formed of a resin having a heat resistance of not lower than 130° C. and lower than 200° C., the residual film is thermally decomposed in the subsequent soldering step in which the magnet wire is dipped in a solder bath having a temperature of about 360° C. It follows that the residual film is removed from the conductor in the soldering step. As a result, the insulating covering is completely removed from the conductor in the soldering step, leading to an improved wettability between the conductor surface and the solder. Naturally, the conductor is strongly soldered to the object. In order to improve the solderability, it is preferable to use the flux.

Let us describe some Examples of the present invention together with Comparative Examples.

EXAMPLE 1

1.0 mol of dimethyl terephthalate, 0.6 mol of ethylene glycol and 0.5 mol of glycerine were put in a flask. The flask was heated while stirring the mixture put therein so as to carry out reactions. The temperature of the reaction system was elevated to promote the reaction while distilling methanol. When the reaction temperature reached about 220° C., the viscosity of the reaction mixture was measured.

Then, cresol was put in the flask, followed by cooling the reaction mixture to 80° C. In the next step, 12 g of tetrabutyl titanate was added to the reaction mixture and the resultant mixture was kept stirred 3 hours, followed by adding cresol and a solvent naphtha to the reaction mixture to dilute the mixture, therefor to obtain a polyester resin coating material containing 30% of a nonvolatile component. The baked film of the polyester resin coating material was found to exhibit a heat resistance of about 170° C. specified in IEC Pub. 172.

A copper wire having a diameter of 0.1 mm was coated with the resultant resin coating material followed by baking the coated material and repeating the coating and baking to form a inner layer of a laminate structure having a thickness of 2 μm. Then, the inner layer was further coated with Pyre-ML (trade name of polyimide resin coating material manufactured by Du Pont) having a heat resistance of 250° C. specified in Pub. 172. The polyimide resin coating material was coated, followed by baking the coated material and repeating the coating and baking 11 times to form an outer layer having a thickness of 10 μm.

EXAMPLE 2

1.0 mol of trimellitic acid anhydride and 0.5 mol of diamino diphenyl methane were put in a flask. The mixture was heated to 150° C. to carry out a reaction for 3 hours, followed by cooling the reaction mixture to 100° C.

In the next step 3 mols of dimethyl terephthalate 3 mols of ethylene glycol and 2 mols of glycerine were put in the flask, followed by gradually heating the reaction product to reach 210° C. while distilling methanol. Under this condition, the reaction product was allowed to carry out reaction for 5 hours, followed by adding cresol and a solvent naphtha to the reaction product. The resultant system was cooled to 80° C., followed by stirring the cooled system to obtain a polyesterimide resin coating material containing 30% of a nonvolatile component. The baked film of the polyesterimide resin coating material was found to exhibit a heat resistance of about 192° C. specified in IEC Pub 172.

A copper wire having a diameter of 0.1 mm was coated with the resultant resin coating material, followed by baking the coated material and repeating the coating and baking to form a inner layer of a laminate structure having a thickness of 2 μm. Then, the inner layer was further coated with the polyimide resin coating material used in Example 1, followed by baking the coated material and repeating the coating and baking 11 times to form an outer layer, said outer layer having a thickness of 10 μm.

EXAMPLE 3

A copper wire having a diameter of 0.1 mm was coated with Liton 3300 (trade name of an imide-modified polyester resin coating material manufactured by Totoku Toryo CO., Ltd.) having a heat resistance of 180° C. specified in IEC Pub. 172, followed by baking the coated material and repeating the coating and baking to form a inner layer, said lower layer having a thickness of 2 μm. Then, the inner layer was further coated with HI-406 (trade name of a polyamideimide resin coating material manufactured by Hitachi Chemical CO. , Ltd.) having a heat resistance of 240° C., followed by baking the coated material and repeating the coating and baking 9 times to form an outer layer on the inner layer, said upper layer having a thickness of 10 μm.

EXAMPLE 4

A copper wire having a diameter of 0.1 mm was coated only once with the polyesterimide resin coating material equal to that used in Example 2, said coating material having a heat resistance of 192° C. specified in IEC Pub. 172, following by baking the coated material to form a lower layer, said inner layer having a thickness of 1 μm. Then, the inner layer was further coated with PH-20 (trade name of a polyhydantoin resin coating material manufactured by Bayer Inc.) having a heat resistance of 205° C., followed by baking the coated material and repeating the coating and baking 10 times to form an outer layer on the inner layer, said upper layer having a thickness of 11 μm.

EXAMPLE 5

A copper wire having a diameter of 0.1 mm was coated only once with the polyester resin coating material equal to that used in Example 1, followed by baking the coated material to form a inner layer, said inner layer having a thickness of 1 μm. Then, the lower layer was further coated with Solrac XT (trade name of a polyparabanic acid resin coating material manufactured by Tonen Petrochemical Co., Ltd.) having a heat resistance of 232° C., followed by baking the coated material and repeating the coating and baking 10 times to form an outer layer on the inner layer, said upper layer having a thickness of 11 μm.

EXAMPLE 6

A copper wire having a diameter of 0.1 mm was coated only once with the polyester resin coating material equal to that used in Example 1, followed by baking the coated material to form a inner layer, said inner layer having a thickness of 1 μm. Then, the lower layer was further coated with Terebec 800 (trade name of a polyesteramideimide resin coating material manufactured by Dainichiseika Color & Chemicals Mfg. CO., Ltd.) having a heat resistance of 220° C., followed by baking the coated material and repeating the coating and baking 10 times to form an outer layer on the inner layer, said outer layer having a thickness of 11 μm.

EXAMPLE 7

A copper wire having a diameter of 0.1 mm was coated only once with the polyesterimide resin coating material, which is diluted with solvent so as to contain 15% of a nonvolatile component, equal to that used in Example 2, followed by baking the coated material to form a inner layer, said inner layer having a thickness 0.5 μm. Then, the lower layer was further coated with Isomid 40ST (trade name of a polyesterimide resin coating material manufactured by Nisshoku Schenectady Chemicals INC) having a heat resistance of 206° C., followed by baking the coated material and repeating the coating and baking 10 times to form an outer layer on the inner layer, said outer layer having a thickness of 11 μm.

EXAMPLE 8

A copper wire having a diameter of 0.1 mm was coated with the polyesterimide resin coating material equal to that used in Example 2, followed by baking the coated material and repeating the coating and baking to form a inner layer, said inner layer having a thickness of 4 μm. Then, the inner layer was further coated with a polyimide resin coating material equal to that used in Example 1, followed by baking the coated material and repeating the coating and baking 8 times to form an upper layer on the inner layer, said outer layer having a thickness of 8 μm.

EXAMPLE 9

A copper wire having a diameter of 0.7 mm was coated only once with the polyesterimide resin coating material equal to that used in Example 2, followed by baking the coated material to form a inner layer, said inner layer having a thickness of 5 μm. Then, the lower layer was further coated with a polyimide resin coating material equal to that used in Example 1, followed by baking the coated material and repeating the coating and baking 7 times to form an outer layer on the inner layer, said upper layer having a thickness of 25 μm.

COMPARATIVE EXAMPLE 1

A copper wire having a diameter of 0.1 mm was coated with HI-406 (trade name of a polyamideimide resin coating material manufactured by Hitachi Chemical CO. Ltd.) having a heat resistance of 240° C. specified in IEC Pub. 172, followed by baking the coated material and repeating the coating and baking to form a inner layer, said inner layer having a thickness of 2 μm. Then, the inner layer was further coated with a polyimide resin coating material equal to that used in Example 1, followed by baking the coated material and repeating the coating and baking 11 times to form an outer layer on the inner layer, said outer layer having a thickness of 10 μm.

COMPARATIVE EXAMPLE 2

A copper wire having a diameter of 0.1 mm was coated with a polyvinyl formal resin coating material having a heat resistance of 108° C. specified in IEC Pub. 172, said resin coating material having been prepared by dissolving polyvinyl formal in a solvent mixture consisting of cresol and a solvent naphtha, followed by baking the coated material and repeating the coating and baking twice to form a inner layer, said lower layer having a thickness of 3 μm. Then, the inner layer was further coated with a polyamideimide resin coating material equal to that used in Example 3, followed by baking the coated material and repeating the coating and baking 8 times to form an outer layer on the lower layer said outer layer having a thickness of 9 μm

COMPARATIVE EXAMPLE 3

A copper wire having a diameter of 0.1 mm was coated with a polyester resin coating material equal to that used in Example 1, followed by baking the coated material and repeating the coating and baking 5 times to form a inner layer, said inner layer having a thickness of 6 μm. Then, the inner layer was further coated with a polyamideimide resin coating material equal to that used in Example 3, followed by baking the coated material and repeating the coating and baking 5 times to form an upper layer on the inner layer, said outer layer having a thickness of 6 μm.

COMPARATIVE EXAMPLE 4

A copper wire having a diameter of 0.1 mm was coated with a polyester resin coating material, which is diluted with solvent so as to contain 7% of a nonvolatile component, equal to that used in Example 1, followed by baking the coated material and repeating the coating and baking 5 times to form a inner layer, said inner layer having a thickness of 0.2 μm. Then, the inner layer was further coated with a polyamideimide resin coating material equal to that used in Example 3, followed by baking the coated material and repeating the coating and baking 10 times to form an outer layer on the inner layer, said outer layer having a thickness of 11 μm.

The magnet wire obtained in each of Examples 1 to 9 and Comparative Examples 1 to 4 was subjected to tests for measuring the withstand voltage residual rate, the softening temperature and the solderability. Table 1 shows the results together with the outer diameter of the conductor included in the magnet wire, such as the kind of the resin coating materials used for forming the inner and outer layers of the insulating covering, the heat resistance of the resin coating material specified in IEC Pub. 172, the thickness of each of the inner and outer layer of the insulating covering, the number of coatings, and the ratio of the thickness of the inner layer to the thickness of the entire insulating covering.

EVALUATION METHOD

Withstand Voltage Residual Rate

The dielectric breakdown voltage A of the test piece under the normal condition was measured by the method specified in NEMA MW-1000. Then, another test piece was put in a constant temperature oven set at 250° C. and left to stand for 168 hours, followed by measuring the dielectric breakdown voltage B. The withstand voltage residual rate was calculated by the formula: $100\times(A-B)/A$. In general, the withstand voltage residual rate of the test piece having a heat resistance of at least 200° C. specified in IEC Pub. 172 is at least 40%.

Softening Temperature

The softening temperature was measured by the method specified in JIS (Japanese Industrial Standards) C-3003. Specifically, the softening temperature was measured by a ring-like cross method, with the temperature elevation rate set at 2° C./min. (More specifically, the ring-like cross method involves taking two test pieces of wire from the same bobbin, formulating them into a ring-form, crossing them into a particular configuration, adding a dead weight, putting the assembly into a thermostatic oven, and then measuring the resistance to softening.) Where the conductor had an outer diameter of 0.1 mm, the softening temperature was measured with a load of 64 g. On the other hand, where the conductor had an outer diameter of 0.7 mm, the softening temperature was measured with a load of 700 g. In general, the test piece having a heat resistance of at least 200° C. specified in IEC Pub. 172 has a softening temperature of at least about 400° C.

Solderability

The insulating covering was removed by a pulse oscillation type TEA (Transversely Excited Atmospheric Pressure) $CO_2$ laser, followed by applying a soldering treatment to the covering-removed portion of the magnet wire so as to determine the solderability of the test piece. The the insulating covering was removed from the magnet wire test piece by the TEA type $CO_2$ laser under the conditions given below:

Position of the Insulating Covering: Rearward of the focus of the laser light beam in the running direction of the beam Area of Irradiation: 10 mm (length)×2 mm (width)

Output Power of the Laser Apparatus: 6J

Irradiation Density: 18.5 J/cm$^2$

Irradiating Direction:

Two contradictory directions for the test piece including a conductor having an outer diameter of 0.1 mm;

Three Directions crossing at 120° C. for the test piece including a conductor having an outer diameter of 0.7 mm Frequency of Irradiation: 10 Hz The Number of Irradiations: 10 times The test piece is coated with the AA grade flux described in JIS Z 3283. The AA grade corresponds RMA in MIL standard QQ-S-571d. The test piece was dipped in a solder bath (Pb/Sn=50/50) of 360° C. for 2 seconds. The solderability was evaluated when the test piece was pulled out of the solder bath on the basis of the solder amount attached to the portion from which the insulating covering was removed by the laser irradiation, as follows:

A: The solder was attached neatly and uniformly over the entire region of the insulating covering-removed portion.

B: The solder attachment was nonuniform.

C: The solder was not attached at all.

TABLE 1

| | Conductor Diameter (mm) | Inner Layer Kind | Inner Layer Heat resistance (°C.) | Inner Layer thickness (μm) | Inner Layer Number of coatings | Outer Layer Kind | Outer Layer Heat resistance (°C.) | Outer Layer thickness (μm) | Outer Layer Number of coatings |
|---|---|---|---|---|---|---|---|---|---|
| Example 1 | 0.1 | Polyester | 170 | 2 | 2 | Polyimide | 250 | 10 | 12 |
| Example 2 | 0.1 | *Polyesterimide | 192 | 2 | 2 | polyimide | 250 | 10 | 12 |
| Example 3 | 0.1 | Imide-modified polyester | 180 | 2 | 2 | Polyamide-imide | 240 | 10 | 10 |
| Example 4 | 0.1 | *Polyesterimide | 192 | 1 | 1 | Polyhydantoin | 205 | 11 | 11 |
| Example 5 | 0.1 | Polyester | 170 | 1 | 1 | Polyparabanic acid | 232 | 11 | 11 |
| Example 6 | 0.1 | Polyester | 170 | 1 | 1 | Polyester amideimide | 220 | 11 | 11 |
| Example 7 | 0.1 | *Polyesterimide | 192 | 0.5 | 1 | **Polyester-imide | 206 | 11 | 11 |
| Example 8 | 0.1 | *Polyesterimide | 192 | 4 | 2 | Polyimide | 250 | 8 | 9 |
| Example 9 | 0.7 | *Polyesterimide | 192 | 5 | 1 | Polyimide | 250 | 25 | 8 |
| Comparative Example 1 | 0.1 | Polamideimide | 240 | 2 | 2 | Polyimide | 250 | 10 | 12 |
| Comparative Example 2 | 0.1 | Polyminyl formal | 108 | 3 | 3 | Polyamide-imide | 240 | 9 | 9 |
| Comparative Example 3 | 0.1 | Polyester | 170 | 6 | 6 | Polyamide-imide | 240 | 6 | 6 |
| Comparative Example 4 | 0.1 | Polyester | 170 | 0.2 | 1 | Polyamide-imide | 240 | 11 | 11 |

| | Loader layer thickness/ Insulating covering thickness | Withstand voltage residual rate (%) | Softening temperature (°C.) | Solderability |
|---|---|---|---|---|
| Example 1 | 1/6 | 53 | 480 or more | A |
| Example 2 | 1/6 | 65 | 480 or more | A |
| Example 3 | 1/6 | 50 | 445 | A |
| Example 4 | 1/12 | 52 | 430 | A |
| Example 5 | 1/12 | 58 | 460 | A |
| Example 6 | 1/12 | 55 | 435 | A |
| Example 7 | 1/23 | 49 | 440 | A |
| Example 8 | 1/3 | 50 | 469 | A |
| Example 9 | 1/6 | 66 | 480 or more | A |
| Comparative Example 1 | 1/6 | 69 | 480 or more | C$^{\Delta}$ |
| Comparative Example 2 | 1/4 | 25$^{\Delta}$ | 390$^{\Delta}$ | A |
| Comparative Example 3 | 1/2 | 18$^{\Delta}$ | 380$^{\Delta}$ | A |
| Comparative Example 4 | 1/56 | 57 | 446 | B$^{\Delta}$ |

*Does not contain aromatic trihydric alcohol
**Contains aromatic trihydric alcohol
$^{\Delta}$Poor characteristics As apparent from Table 1, the insulating covering can be removed in a short time by the treatment with a TEA type $CO_2$ laser beam when it comes to the magnet wire of the present invention having a high heat resistance. In addition, the magnet wire of the present invention exhibits a satisfactory solderability and a resistance to heat of at least 200° C. as specified in IEC Pub. 172. On the other hand, the magnet wire in each of Comparative Examples 1 to 4 was found to be unsatisfactory in each of the withstand voltage residual rate, the softening temperature and the solderability.

EXAMPLE 10

A conductor wire having a diameter of 0.1 mm was coated with a polyester resin coating material, followed by baking the coating material and repeating the coating and baking to form a lower layer, said inner layer having a thickness of 2 μm, as in Example 1. Then, the inner layer was further coated with a polyimide resin coating material having a heat resistance of 250° C. specified in IEC Pub. 172, followed by baking the coating material and repeating the coating and baking 11 times so as to form an outer layer, said upper layer having a thickness of 10 μm. Three magnet wires were prepared in this fashion.

The insulating coverings of these magnet wires were irradiated with a laser beam with the irradiation densities of 14, 20, and 36 J/cm$^2$, respectively. After removal of the insulating covering by the laser beam irradiation, a soldering treatment was applied to the covering-removed portion of the magnet wire so as to evaluate the solderability. All of these three test pieces were found to be mark "A" in the solderability.

As apparent from the experimental data described above, the method of the present invention makes it possible to remove an insulating covering from a magnet wire with a relatively low irradiation density of a laser beam. In addition, a satisfactory soldering can be achieved in the covering-removed portion of the magnet wire.

As described above in detail, the present invention provides a magnet wire having a high heat resistance. In the magnet wire of the present invention, a conductor is covered with an insulating covering exhibiting a heat resistance of at least 200° C. specified in IEC Pub. 172. In addition, the insulating covering over a large region can be removed easily and in a short time by the treatment with a high energy laser beam. Of course, the conductor is not damaged during the treatment with the high energy laser beam, with the result that a soldering can be applied satisfactorily to the covering-removed portion of the magnet wire. The present invention also provides a method of removing an insulating covering from a magnet wire. The method of the present invention makes it possible to remove easily and in a short time the insulating covering in a terminal portion of a magnet wire, said insulating covering having such a high heat resistance as at least 200° C. as specified in IEC Pub. 172. In addition, the insulating covering over a large region can be removed easily and in a short time. Of course, the conductor wire is not damaged during the removal of the insulating covering, with the result that a soldering can be applied satisfactorily to the covering-removed portion of the magnet wire.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A method of applying a soldering treatment to a magnet wire having a high heat resistance, comprising the steps of:

preparing a magnet wire having a high heat resistance, comprising a conductor and an inner layer formed by baking a first resin coating covering the outer surface of the conductor, said inner layer having a heat resistance specified in IEC Pub. 172, which is not lower than 130° C. and is lower than 200° C., and an outer layer formed by baking a second resin coating covering the outer surface of said inner layer, said outer layer having a heat resistance specified in IEC Pub. 172, which is not lower than 200° C., the thickness of said inner layer falling within a range of between 0.3 μm and 5 μm and being not larger than ⅓ of the sum of the thicknesses of the outer and inner layers;

irradiating the insulating covering of said magnet wire having a high heat resistance with a laser beam so as to remove said outer layer and said inner layer and to expose a part of the conductor; and bringing an exposed portion of the conductor into contact with a molten solder so as to to achieve a soldering between said exposed part and a material to be bonded to said exposed part.

2. The method of applying a soldering treatment to a magnet wire having a high heat resistance according to claim 1, wherein said inner layer of the insulating covering is of a laminate structure consisting of a first coating layer and a second coating layer.

3. The method of applying a soldering treatment to a magnet wire having a high heat resistance according to claim 1, wherein said outer layer is of a laminate structure consisting of coating layers, the number of which is at least twice the number of coating layers forming the inner layer.

4. The method of applying a soldering treatment to a magnet wire having a high heat resistance according to claim 1, wherein said inner layer is formed of a resins elected from the group consisting of a polyester series resin, and a polyesterimide series resin which does not contain an aromatic trihydric alcohol.

5. The method of applying a soldering treatment to a magnet wire having a high heat resistance according to claim 1, wherein said outer layer is formed of a resins elected from the group consisting of a polyamide series resin, a polyamideimide series resin, a polyparabanic acid series resin, a polyesteramideimide series resin, a polyhydantoin series resin, and a polyesterimide series resin which contains an aromatic trihydric alcohol.

* * * * *